US008148034B2

(12) United States Patent
Park et al.

(10) Patent No.: US 8,148,034 B2

(45) Date of Patent: Apr. 3, 2012

(54) METALLIC SEPARATOR FOR FUEL CELL

(75) Inventors: Jung-ock Park, Yongin-si (KR); Tae-young Kim, Seoul (KR); Kyoo-young Kim, Pohang-si (KR); Duck-young Yoo, Seoul (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 747 days.

(21) Appl. No.: 11/524,967

(22) Filed: Sep. 22, 2006

(65) Prior Publication Data

US 2007/0072039 A1 Mar. 29, 2007

(30) Foreign Application Priority Data

Sep. 26, 2005 (KR) ........................ 10-2005-0089471

(51) Int. Cl.

| | |
|---|---|
| ***H01M 4/64*** | (2006.01) |
| ***H01M 4/66*** | (2006.01) |
| ***H01M 8/04*** | (2006.01) |
| ***H01M 2/14*** | (2006.01) |
| ***H01M 2/20*** | (2006.01) |
| ***H01M 8/24*** | (2006.01) |

(52) U.S. Cl. ......... 429/522; 429/457; 429/514; 429/519

(58) Field of Classification Search .................... 429/30, 429/32, 34–35, 38, 457, 514, 519, 522, 535; 29/623.1–623.5; 428/544, 546–548, 567, 428/569; 420/8, 34, 52, 56–57, 60–61, 67, 420/94, 96–97, 122–123, 128; 148/320, 148/325, 327, 336

See application file for complete search history.

(56) References Cited

U.S. PATENT DOCUMENTS

| | | | | |
|---|---|---|---|---|
| 3,551,142 | A * | 12/1970 | Decroix | 420/45 |
| 3,859,086 | A * | 1/1975 | Church et al. | 419/31 |
| 5,298,093 | A * | 3/1994 | Okamoto | 148/325 |
| 6,379,476 | B1 | 4/2002 | Tarutani et al. | |
| 6,730,407 | B2 * | 5/2004 | Mori et al. | 428/425.8 |
| 2003/0170526 | A1 * | 9/2003 | Hodgson et al. | 429/34 |
| 2005/0008911 | A1 * | 1/2005 | Kaye | 429/26 |
| 2005/0014059 | A1 * | 1/2005 | Kaye | 429/38 |
| 2005/0211344 | A1 * | 9/2005 | Omura et al. | 148/542 |

FOREIGN PATENT DOCUMENTS

| | | |
|---|---|---|
| EP | 1046723 | 10/2000 |

OTHER PUBLICATIONS

Fuel Cell Handbook, 5th ed. West Virginia, U.S. Department of Energy, Oct. 2000. pp. 1-3-1-5.*

* cited by examiner

*Primary Examiner* — Barbara Gilliam

*Assistant Examiner* — Claire L Roe

(74) *Attorney, Agent, or Firm* — Lee & Morse P.C.

(57) ABSTRACT

A metallic separator for a fuel cell including 2.2 to 6.0 parts by weight of tungsten based on 100 parts by weight of stainless steel containing molybdenum, and the weight ratio of molybdenum to tungsten (Mo/W) is 0.15 to 1.60. The separator for fuel cells has excellent anti-corrosive properties and contact resistance as low as that of a metal material, and thus, a fuel cell having high efficiency can be manufactured at a reasonable cost using the separator.

9 Claims, 3 Drawing Sheets

METALLIC SEPARATOR FOR FUEL CELL

CROSS-REFERENCE TO RELATED APPLICATIONS

This application claims the benefit of Korean Patent Application No. 2005-89471, filed on Sep. 26, 2005, in the Korean Intellectual Property Office, the disclosure of which is incorporated herein in its entirety by reference.

BACKGROUND OF THE INVENTION

1. Field of the Invention

Aspects of the present invention relate to a metallic separator for a fuel cell, and more particularly, to a metallic separator for a fuel cell having excellent anti-corrosive properties and a low contact resistance.

2. Description of the Related Art

In a fuel cell, a fuel such as hydrogen, natural gas, methanol, or the like is oxidized to produce electrons and hydrogen ions at an anode. The hydrogen ions produced in the anode pass through an electrolyte membrane to a cathode, and the electrons produced in the anode are supplied to an external circuit through a wire. The hydrogen ions that reach the cathode are combined with the electrons that reach the cathode through the external circuit and with oxygen supplied from the outside to form water.

Fuel cells have been promoted as next-generation energy conversion devices since they have a high electricity generation efficiency and are environmentally friendly. Fuel cells can be classified into polymer electrolyte membrane fuel cells (PEMFCs), phosphoric acid fuel cells (PAFCs), molten carbonate fuel cells (MCFCs), solid oxide fuel cells (SOFCs), etc., according to the type of electrolyte used. The operating temperature, materials of constitutional elements and the like vary according to the type of fuel cell.

PEMFCs can be operated at relatively low operating temperatures, such as, for example, 80 to 120° C., and have a significantly high current density. Thus, PEMFCs can be used as power supplies for vehicles and homes.

The main constitutional elements of a PEMFC are a bipolar plate and a membrane electrode assembly (MEA). In order to make PEMFCs compact, light and economical, it would be desirable to improve particular aspects of PEMFCs such as the bipolar plate.

The MEA includes an anode in which the fuel is oxidized, a cathode in which an oxidizing agent is reduced, and an electrolyte membrane interposed between the anode and the cathode. The electrolyte membrane has ionic conductivity in order to deliver hydrogen ions generated in the anode to the cathode, and is an electric insulator in order to electronically insulate the anode from the cathode.

Typically, the bipolar plate has channels through which fuel and air flow and functions as an electron conductor for transporting electrons between MEAs. Thus, the bipolar plate should be non-porous such that the fuel and the oxygen can be kept separated, and should have excellent electrical conductivity and sufficient thermal conductivity to control the temperature of the fuel cell. Furthermore, the bipolar plate should have sufficient mechanical strength to bear a clamping force applied to the fuel cell and should be corrosion-resistant with respect to hydrogen ions.

Conventionally, graphite has been the most common material used to form bipolar plates in PEMFCs, and channels through which fuel and air flow have typically been formed using a milling process. A graphite plate has sufficient electrical conductivity and resistance to corrosion to meet the requirements of a PEMFC. However, graphite plate and milling processes for shaping the plates are expensive. Further, graphite plates are typically brittle and thus, it is difficult to process bipolar plates with a thickness of less than 2-3 mm. Due to the difficulty in decreasing the thickness of bipolar plates made of graphite, it is difficult to decrease the size of a fuel cell stack consisting of several tens to several hundreds of unit cells.

In order to reduce the production costs and the thickness of bipolar plates, an attempt has been made to use metals as bipolar plate materials. Metals have most of the physical properties required for bipolar plates, and the costs of metals and processing thereof are reasonable. If metal can be used as the bipolar plate material, the costs of the bipolar plate can be reduced by 99% or more.

However, a metallic bipolar plate may erode under the acidic conditions that are present inside a fuel cell, and thus, an oxidized film that imposes a high electrical resistance may be easily formed. As a result, serious problems such as membrane poisoning and increased contact resistance may occur. Corrosion of the metallic bipolar plate not only causes defects in the bipolar plate itself, but also poisons the catalyst and electrolyte due to the diffusion of metal ions into the electrolyte membrane. When the catalyst is poisoned, catalytic activity is decreased, and when the electrolyte is poisoned, the proton conductivity of the electrolyte is reduced, thereby resulting in deterioration of the performance of the fuel cell.

In addition, since the corroded metal dissolves, the contact between the separator and the MEA deteriorates and the electrical resistance is increased, resulting in deterioration of the performance of the fuel cell.

Thus, it has not yet been possible to use metallic bipolar plates in PEMFCs because of the likelihood of corrosion of the metal. For example, in a 1000-hour performance test, PEMFCs having bipolar plates formed of stainless steel, a Ti alloy, an Al alloy, and a Ni alloy, respectively, showed lower performance than a PEMFC having a graphite bipolar plate.

Therefore, research into ways to improve the anti-corrosive properties of a metallic bipolar plate, such as a method of coating a surface with a material having an anti-corrosive property, has been carried out.

For example, a method of coating the surface of a bipolar plate composed of Ti or stainless steel with a material such as TiN that has excellent anti-corrosive properties and is electrically conductive is disclosed in Korean Laid-Open Patent Publication No. 2003-0053406.

While an Al alloy or a Ti alloy is susceptible to forming an oxidized film, stainless steel, which is relatively less susceptible to forming an oxidized film and has high corrosion resistance, is an excellent alternative to graphite.

The above discussion with respect to the bipolar plate is also applicable to an end plate, a cooling plate, and a separator.

An end plate is an electrically conductive plate having channels for either a fuel or an oxidizing agent on only one side. An end plate having channels for a fuel is attached to an MEA disposed at one end of a fuel cell stack, and an end plate having channels for an oxidizing agent is attached to an MEA disposed at the other end of the fuel stack.

A cooling plate is an electrically conductive plate having channels for a fuel or an oxidizing agent on one side and channels for a cooling fluid on the other side.

A separator is commonly used when a flow field is formed in diffusion layers of an anode and a cathode and generally a bipolar plate is used when the flow field is not included.

Advantageously, the separator may have low gas permeability, excellent electrical conductivity, and excellent anti-corrosive properties.

Herein, the term "separator" is used generally to refer to the bipolar plate, the end plate, the cooling plate, and the specific separator discussed above.

Problems relating to the bipolar plate or separator of a PEMFC have been described above, but such problems also occur in MCFCs, PAFCs, DMFCs, etc. Accordingly, the separator according to aspects of the present invention may be used in these types of fuel cells as well.

Based on the above description, the development of a separator having improved anti-corrosive properties and contact resistance is desired.

SUMMARY OF THE INVENTION

Aspects of the present invention provide a metallic separator for a fuel cell having excellent anti-corrosive properties and small contact resistance.

Aspects of the present invention also provide a fuel cell having excellent efficiency which can be manufactured at a reasonable cost.

According to an aspect of the present invention, there is provided a separator comprising a stainless steel containing molybdenum and tungsten.

According to an aspect of the present invention, there is provided a separator comprising a stainless steel comprising chromium, nickel, molybdenum, tungsten and iron.

According to an aspect of the present invention, there is provided a separator for a fuel cell including: 17.3 to 19.0% by weight of chromium (Cr); 10.5 to 14.5% by weight of nickel (Ni); 1.0 to 4.3% by weight of molybdenum (Mo); 2.26 to 6.0% by weight of tungsten (W); and 58.0 to 65.0% by weight of iron (Fe), wherein the weight ratio of Mo to W (Mo/W) is 0.15 to 1.60.

According to another aspect of the present invention, there is provided a fuel cell using the separator for fuel cells.

Since the separator for fuel cells has excellent anti-corrosive properties and low contact resistance, a fuel cell manufactured using the same is cost effective and highly efficient.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
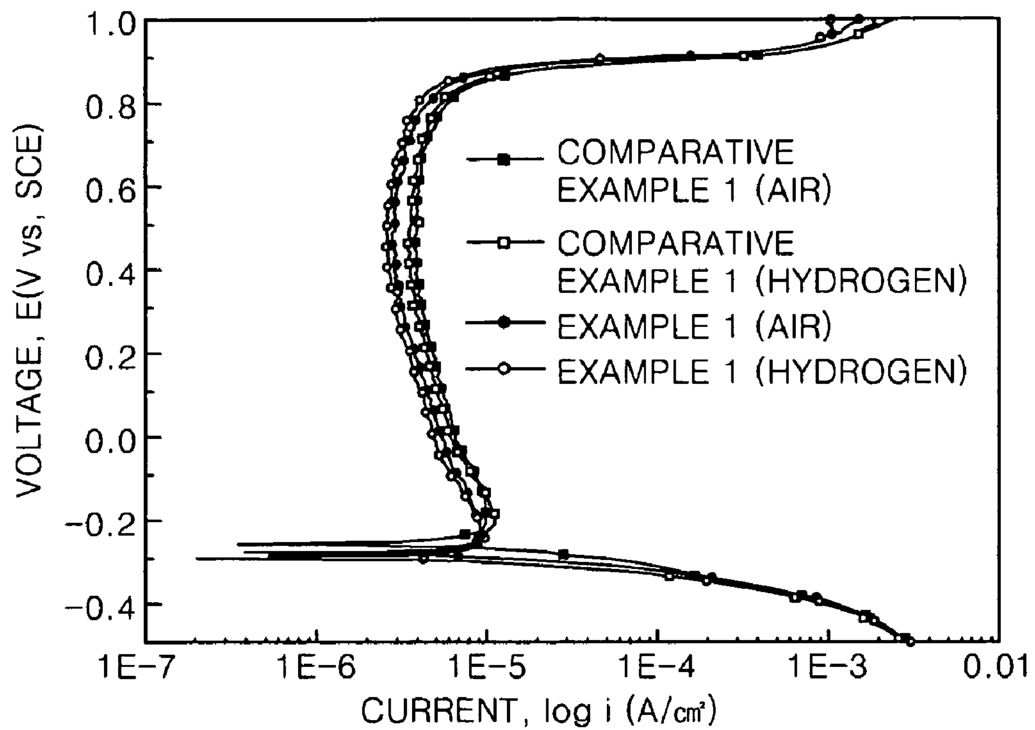
FIG. 1 is a graph of voltage versus the log of passive current density for samples of Example 1 and Comparative Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A separator for a fuel cell according to an embodiment of the present invention is formed of stainless steel containing Mo and tungsten. The tungsten provides excellent anti-corrosive properties and contact resistance.

In general, stainless steel refers to an iron alloy including chromium (Cr) and nickel (Ni), and optionally containing carbon (C), silicon (Si), or molybdenum (Mo), to provide some degree of anti-corrosive properties.

A separator made of stainless steel has an excellent mechanical strength and a low cost. However, stronger anti-corrosive properties than can be found in ordinary stainless steel are required for a separator that is exposed to the harsh chemical environment surrounding the cathode and anode of a fuel cell.

In an embodiment of the present invention, the separator includes 17.3 to 19.0% by weight of Cr, 10.5 to 14.5% by weight of Ni, 1.0 to 4.3% by weight of Mo, 2.26 to 6.0% by weight of W, and 58.0 to 65.0% by weight of Fe, and the weight ratio of Mo to W (Mo/W) is 0.15 to 1.60.

Cr plays a major role in improving corrosion resistance. The amount of Cr may be 17.3 to 19.0% by weight of the separator. When the amount of Cr is less than 17.3% by weight, a stable passivated film of the stainless steel may not be formed, and thus, sufficient corrosion resistance may not be obtained. When the amount of Cr is greater than 19.0% by weight, processing is difficult due to an increase in the rate of precipitation of intermetallic compounds, which greatly decrease the corrosion resistance and impact toughness of the separator.

Ni plays a major role in the stability of the austenite phase of the separator. The amount of Ni may be 10.5 to 14.5% by weight of the separator. When the amount of Ni increases, the proportion of austenite existing in the stainless steel also increases. When the amount of Ni is outside of an adequate range, the ratio of the austenite phase to the ferrite phase is inappropriate, and thus the stainless steel does not show the typical characteristics of stainless steel. In particular, when the amount of Ni is less than 10.5% by weight, the amount of the stainless steel in the ferrite phase, which has low solubility of N, is too high and chromium nitride is formed, resulting in low corrosion resistance and impact toughness. On the other hand, when the amount of Ni is greater than 14.5% by weight, the manufacturing cost of the separator is high, since the relative cost of Ni is high.

Similarly to Cr, Mo plays a major role in improving corrosion resistance. The amount of Mo may be 1.0 to 4.3% by weight of the separator. In particular, Mo provides excellent pitting corrosion resistance. When the amount of Mo is less than 1.0% by weight, the pitting corrosion resistance is low. When the amount of Mo is greater than 4.3% by weight, the precipitation of intermetallic compounds is facilitated, thereby decreasing the corrosion resistance and impact toughness of the separator.

Similarly to Mo, W plays a major role in improving corrosion resistance. The amount of W may be 2.26 to 6.0% by weight of the separator. In particular, when W is included in the stainless steel, the stainless steel exhibits excellent pitting corrosion resistance when in contact with a low pH solution, and the precipitation of a sigma phase is slowed down. When the amount of W is less than 2.26% by weight, there is little improvement in corrosion resistance. When the amount of W is greater than 6.0% by weight, the mechanical properties of the separator deteriorate and manufacturing costs are high.

Moreover, the weight ratio of Mo to W (Mo/W) may be 0.15 to 1.60. When the ratio is less than 0.15, the corrosion resistance is low. When the ratio is greater than 1.60, the precipitation of a secondary phase (sigma phase and/or chi phase), which has an adverse effect on corrosion resistance and mechanical properties of the stainless steel, is facilitated.

For example, the weight ratio of Mo to W (Mo/W) can be 0.15 to 0.50.

The amount of Fe is determined to make up the remainder after the amounts of Cr, Ni, and other elements described herein are calculated.

The separator for a fuel cell according to an embodiment of the present invention may further include carbon (C), silicon (Si), manganese (Mn), phosphorus (P), and/or nitrogen (N).

C strongly stabilizes the austenite phase. Accordingly, the amount of C may be greater than 0% by weight. However, when the amount of C is greater than 0.03% by weight of the separator, chromium carbide may precipitate, decreasing the corrosion resistance. Accordingly, the amount of C may be less than 0.03% by weight.

Si is commonly used as a deoxidant during steelmaking. However, a high content of Si facilitates the precipitation of intermetallic compounds. Therefore, the amount of Si should be restricted and may be 0.50 to 0.75% by weight of the separator.

Mn acts as an austenite former and also has the effect of increasing solubility of nitrogen in stainless steel. However, Mn forms MnS, which reduces corrosion resistance. Thus, the amount of Mn should be restricted and may be 0.60 to 1.55% by weight of the separator.

Sulfur is an impurity element in stainless steel. When a large amount of sulfur is contained in the separator, it generates non-metallic compounds, causing the separator to have non-uniform properties. Therefore, in order to reduce such effects, the amount of sulfur may be less than 0.03% by weight.

Nitrogen strongly stabilizes the austenite phase and improves corrosion resistance. The amount of N may be 0.10 to 0.30% by weight of the separator. When the amount of N is less than 0.10% by weight, strength and corrosion resistance, which secondary phase stainless steel should have, are insufficient and the precipitation of metallic compounds can easily occur. When the amount of N is greater than 0.30% by weight, the strength of the austenite phase is high, greatly decreasing processability.

A separator should have excellent electrical conductivity (electrical conductivity>10 S/cm), high corrosion resistance against an acidic electrolyte, hydrogen, oxygen, heat, humidity, and the like (corrosion rate<16 $\mu A/cm^2$), excellent thermal conductivity (thermal conductivity>20 W/mK), and a good gas sealing ability (gas transmission<$10^{-7}$ mbar l/s $cm^2$).

Accordingly, the separator according to an embodiment of the present invention may have an electrical conductivity of 10 S/cm or greater. When the electrical conductivity of the separator is less than 10 S/cm, the efficiency of the fuel cell is decreased. In addition, the separator may have a current density due to corrosion of less than 16 $\mu A/cm^2$. When the current density due to corrosion is greater than 16 $\mu A/cm^2$, which indicates that significant corrosion has occurred, the lifetime of the fuel cell is reduced.

Moreover, the contact resistance of the separator according to an embodiment of the present invention may be less than 0.38 $\Omega\cdot cm^2$ under a pressure of 60 $N/cm^2$. Optionally, the contact resistance of the separator according to an embodiment of the present invention may be less than 0.105 $\Omega\cdot cm^2$ under a pressure of 210 $N/cm^2$. When the contact resistance is greater than 0.38 $\Omega\cdot cm^2$ under a pressure of 60 $N/cm^2$ or greater than 0.105 $\Omega\cdot cm^2$ under a pressure of 210 $N/cm^2$, the efficiency of the fuel cell is decreased.

A fuel cell according to an embodiment of the present invention includes the separator as described above. The fuel cell may be provided according to a conventional method well known in the art using the separator described above. The separator for a fuel cell according to an embodiment of the present invention may be used as a bipolar plate, an end plate, or a cooling plate of the fuel cell.

Since the separator according to an embodiment of the present invention is formed of a metal material having excellent anti-corrosive properties and low contact resistance, the fuel cell including the separator can have excellent efficiency and can be manufactured at a reasonable cost.

Aspects of the present invention will now be described in greater detail with reference to the following examples. The following examples are for illustrative purposes, and are not intended to limit the scope of the present invention.

EXAMPLE 1 and COMPARATIVE EXAMPLE 1

Alloy samples were prepared with the composition illustrated in Table 1. (unit: % by weight).

TABLE 1

| | C | Si | Mn | P | S | Cr | Ni | Mo | W | N | Fe |
|---|---|---|---|---|---|---|---|---|---|---|---|
| Example 1 | 0.020 | 0.52 | 1.52 | 0.029 | 0.003 | 17.92 | 14.04 | 2.05 | 4.16 | 0.2 | balance |
| Comparative Example 1 | 0.017 | 0.50 | 1.54 | 0.029 | 0.003 | 18.70 | 13.83 | 3.79 | — | 0.2 | balance |

Each of the samples manufactured according to the details in Table 1 was immersed in 0.15 M phosphoric acid at a temperature of 80° C., which is similar to the operating conditions of a fuel cell, and a voltage with a scan rate of 0.5 mV/sec was applied to the sample to measure current. Here, in order to create similar conditions to those under normal operating conditions of a fuel cell, air and hydrogen were individually passed through the samples. The results are shown in FIG. 1.

Referring to FIG. 1, the sample of Example 1 (indicated by circles) showed a lower current density than that of Comparative Example 1 (indicated by squares). These results indicate that corrosion of the sample in Example 1 was less than that of Comparative Example 1.

In order to identify the improvement in contact resistance, contact resistance versus pressure was measured for the two samples.

Figure 2:
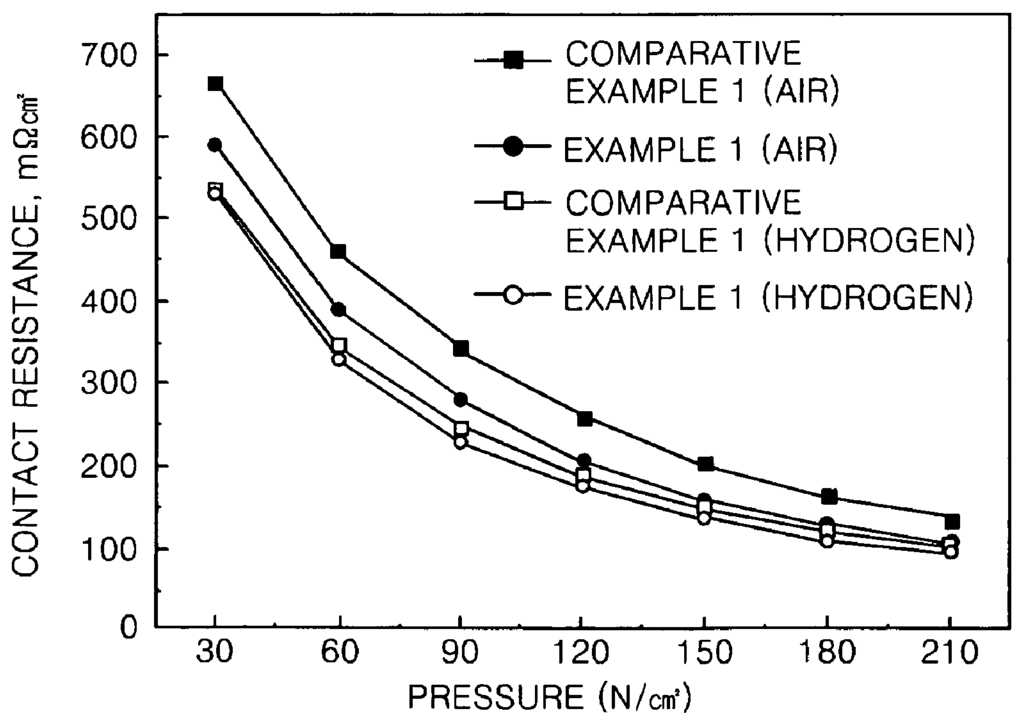
FIG. 2 is a graph of contact resistance versus pressure for the samples of Example 1 and Example 2.

0.15 M phosphoric acid at 80° C. was prepared to create similar conditions to the operating conditions of a fuel cell, and air or hydrogen was bubbled into the phosphoric acid to make the conditions similar to those near a cathode or an anode. The samples were applied to Au electrodes, which were then inserted into the phosphoric acid and pressurized in increments of 30 $N/cm^2$ starting from 30 $N/cm^2$, while current was applied to measure contact resistance. The results are shown in FIG. 2. Referring to FIG. 2, the sample of Example 1 showed a much better contact resistance (that is, a lower contact resistance) than the sample of Comparative Example 1. In particular, in the cathode and anode conditions under a pressure of 210 N/$cm^2$, the contact resistances of the samples of Example 1 and Comparative Example 1 were 104.5/92.5 Ω/cm2 and 134.5/101 Ω/cm2, respectively, showing that the sample of Example 1 provided much better contact resistance than the sample of Comparative Example 1.

EXAMPLE 2

Bipolar plates and end plates were prepared with the same composition as that of the sample of Example 1, and a fuel cell stack in which 3 MEAs were stacked was prepared. A PBI (polybenzimidazole) membrane impregnated with phosphoric acid and having a thickness of 65 μm was used as an electrolyte membrane, and a Pt/C catalyst impregnated with platinum to a concentration of 1.4 mg/cm2 was used to form an anode and a cathode.

Air at a temperature of 150° C. was passed through the cathode at a rate of 1000 ml/min and hydrogen at a temperature of 150° C. was passed through the anode at a rate of 300 ml/min to observe the I-V characteristics and contact resistance of the fuel cell stack. The results are shown in FIG. 3.

Figure 3:
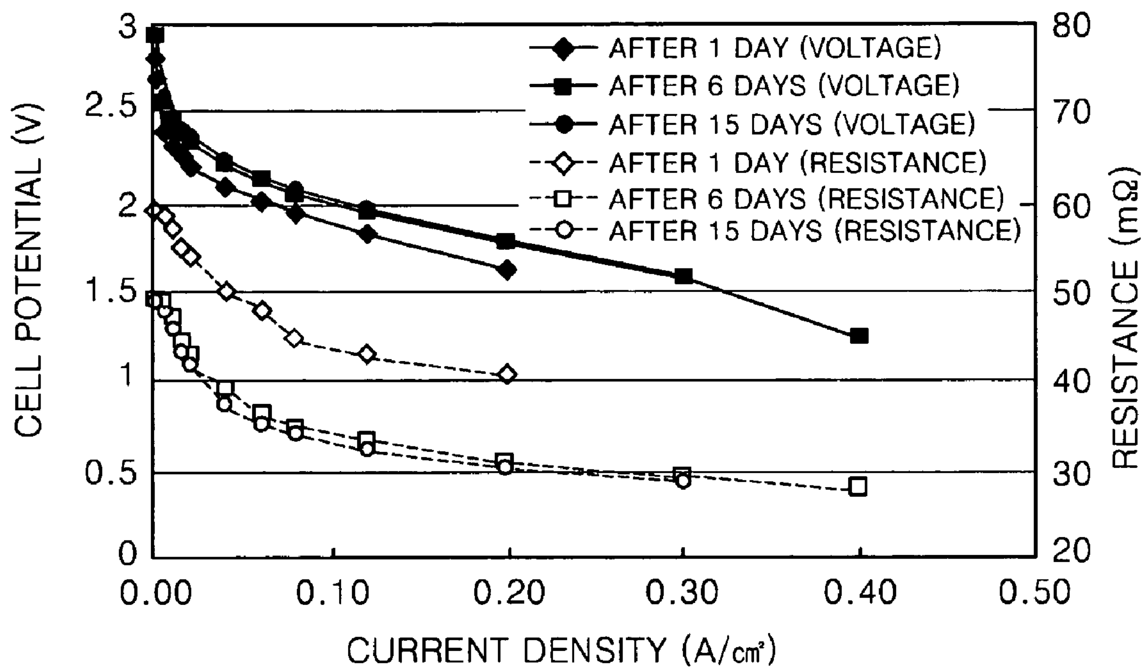
FIG. 3 is a graph of voltage and contact resistance versus current of a fuel cell stack of Example 2.

Referring to FIG. 3, due to stabilization of the initial operation, the resistance decreased and the cell potential increased between the results after 1 day of operation and the results after 6 days of operation. Also, the results after 15 days of operation were similar to the results after 6 days of operation, showing very stable operation.

Figure 4A:
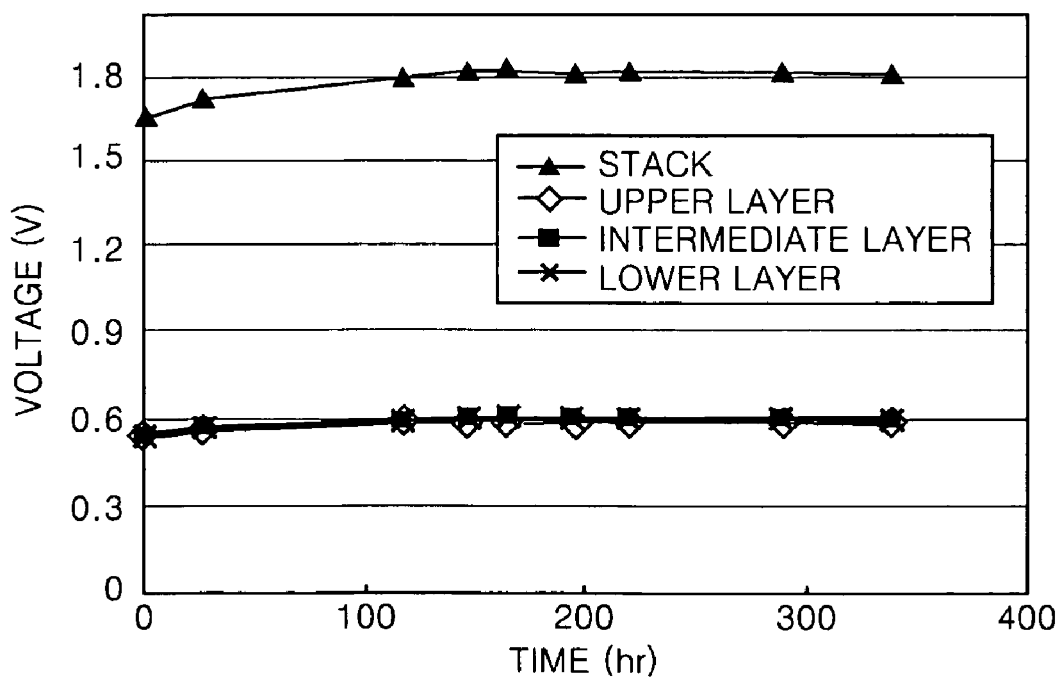
FIGS. 4A and 4B are respectively graphs of voltage and resistance with respect to time for a fuel cell stack of Example 2.
Figure 4B:
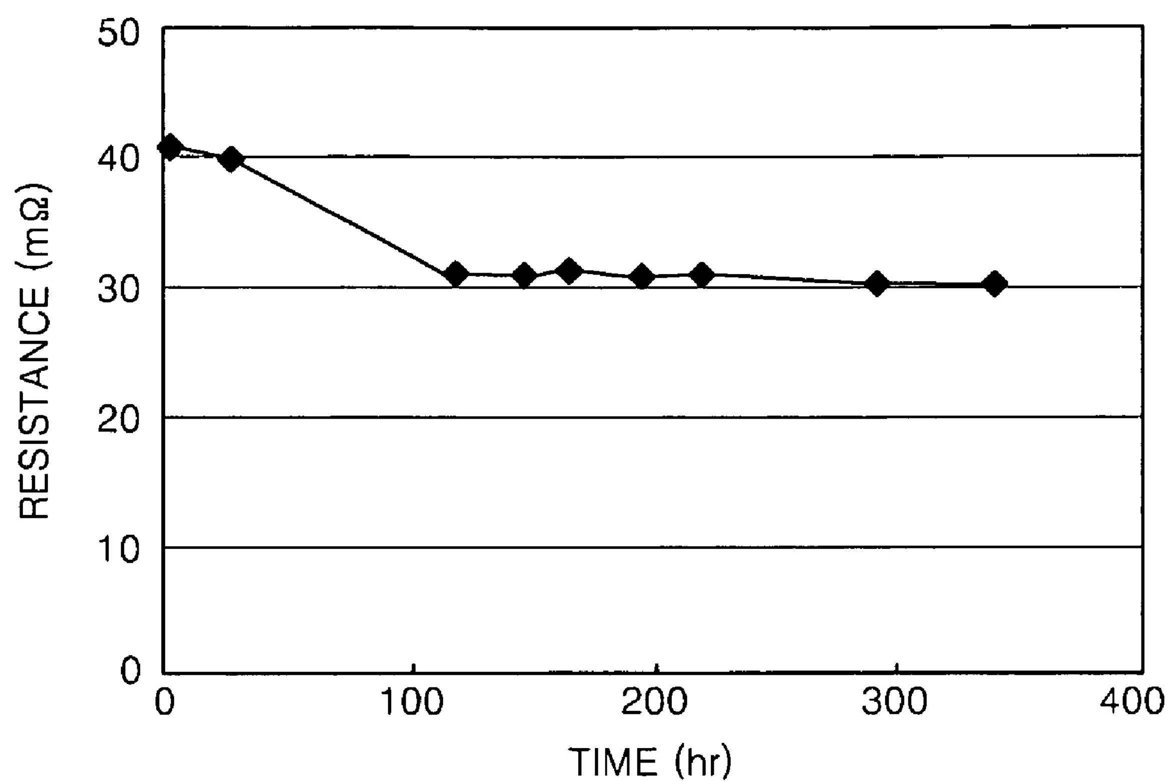

The observed I-V characteristics of the fuel cell stack at a current density of 0.2 A/$cm^2$ with respect to the time elapsed are illustrated in FIGS. 4A and 4B.

As shown in FIG. 4A, even after 2 weeks (about 340 hours) of operation, the overall voltage of the stack and the voltage of each cell remained constant. Also, as illustrated in FIG. 4B, the stack resistance remained constant.

The separator according to embodiments of the present invention has strong corrosion resistance and shows stable performance even in the corrosive environment of the electrode of the fuel cells.

EXAMPLE 3, EXAMPLE 4, COMPARATIVE EXAMPLE 2 and COMPARATIVE EXAMPLE 3

Samples of Example 3, Example 4, Comparative Example 2 and Comparative Example 3 were prepared using the compositions illustrated in Table 2 (unit: % by weight). Passive current density and contact resistance were measured using prepared samples.

TABLE 2

| | Cr | Ni | Mo | W | Mo/W | C | Si | Mn | P | N | Fe |
|---|---|---|---|---|---|---|---|---|---|---|---|
| Example 3 | 18 | 12 | 2 | 4 | 0.5 | 0.02 | 0.60 | 0.80 | 0.02 | 0.15 | balance |
| Example 4 | 18 | 12 | 1 | 6 | 0.17 | 0.02 | 0.65 | 0.85 | 0.02 | 0.15 | balance |
| Comparative Example 2 | 18 | 12 | 4 | 0 | — | 0.02 | 0.70 | 0.90 | 0.03 | 0.20 | balance |
| Comparative Example 3 | 18 | 12 | 3 | 2 | 1.5 | 0.02 | 0.70 | 0.90 | 0.03 | 0.20 | balance |

TABLE 3

| | Passive current density[a] (μA/$cm^2$) | Contact resistance[b] (mΩ · $cm^2$) |
|---|---|---|
| Example 3 | 1.91 | 16.5 |
| Example 4 | 2.04 | 12.1 |
| Comparative Example 2 | 2.48 | 17.2 |
| Comparative Example 3 | 2.31 | 21.9 |

[a]cathode voltage of 0.6 V, anode voltage of −0.1 V
[b]pressurized with 210 N/$cm^2$ As illustrated in Table 3, the passive current density in Examples 3 and 4 was 10 to 23% less than that of Comparative Examples 3 and 4, indicating that corrosion resistance was higher for the samples of embodiments of the present invention.

In addition, referring to Table 3, the contact resistance in Examples 3 and 4 was 5 to 45% less than that of Comparative Examples 2 and 3.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A separator for a fuel cell comprising a stainless steel consisting of:

17.3 to 19.0% by weight of chromium (Cr);
10.5 to 14.5% by weight of nickel (Ni);
1.0 to 4.3% by weight of molybdenum (Mo);
2.26 to 6.0% by weight of tungsten (W); and
58.0 to 65.0% by weight of iron (Fe),
wherein the weight ratio of Mo to W (Mo/W) is 0.15 to 1.60, and
wherein the separator is assembled in a fuel cell having an operating temperature of 80 to 120° C.

2. A separator for a fuel cell comprising a stainless steel consisting of:

17.3 to 19.0% by weight of chromium (Cr);
10.5 to 14.5% by weight of nickel (Ni);
1.0 to 4.3% by weight of molybdenum (Mo);
2.26 to 6.0% by weight of tungsten (W);
58.0 to 65.0% by weight of iron (Fe), and at least one of the following:
0.03% by weight or less of carbon (C);
0.50 to 0.75% by weight of silicon (Si);
0.60 to 1.55% by weight of manganese (Mn);
0.03% by weight or less of sulfur (S); and
0.10 to 0.30% by weight of nitrogen (N),
wherein the weight ratio of Mo to W (Mo/W) is 0.15 to 1.60,and wherein the separator is assembled in a fuel cell having an operating temperature of 80 to 120° C.

3. The separator of claim 1, wherein the weight ratio of molybdenum to tungsten (Mo/W) is 0.15 to 0.50.

4. The separator of claim 1 having a contact resistance of 0.38 $\Omega \cdot cm^2$ or less under a pressure of 60 $N/cm^2$.

5. The separator of claim 1 having a current density due to corrosion of less than 16 $\mu A/cm^2$.

6. The separator of claim 1, wherein the separator is a bipolar plate of a fuel cell.

7. The separator of claim 1, wherein the separator is an endplate of a fuel cell.

8. A fuel cell including at least one separator of claim 1.

9. A fuel cell including at least one separator of claim 2.

* * * * *